Jan. 1, 1952  L. H. MORIN  2,580,816
METHOD OF FORMING PLASTIC CASTINGS WITH METALLIC INSERTS
Filed Aug. 25, 1948
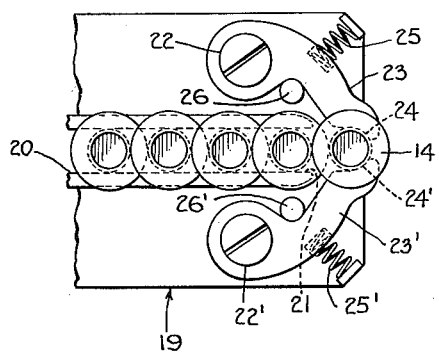
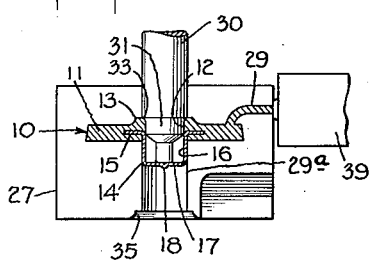
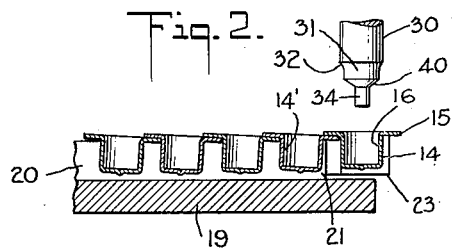
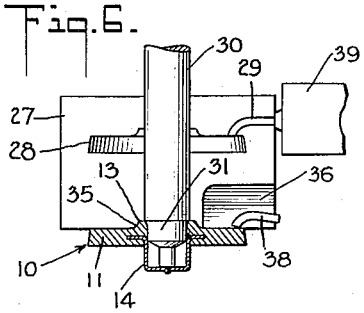
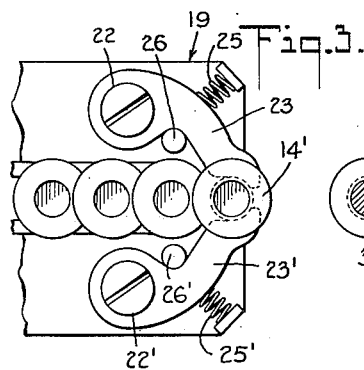
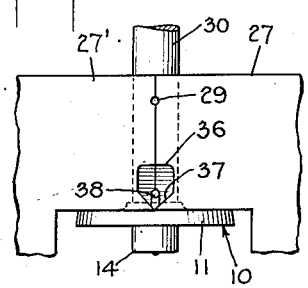
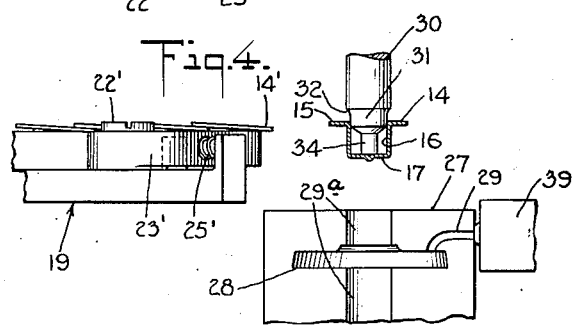
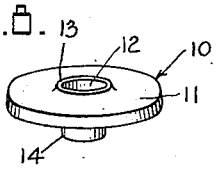
INVENTOR
LOUIS H. MORIN
BY
ATTORNEY

Patented Jan. 1, 1952

2,580,816

UNITED STATES PATENT OFFICE 2,580,816

METHOD OF FORMING PLASTIC CASTINGS WITH METALLIC INSERTS

Louis H. Morin, Bronx, N. Y.

Application August 25, 1948, Serial No. 46,026

3 Claims. (Cl. 18—59)

This invention relates to the formation of plastic castings having metallic inserts. More particularly, the invention deals with a method comprising moving an insert into position to be automatically picked up by a core member, then moving the core member and insert into proper position between a pair of relatively movable dies having mating cavities in order to form a plastic casting thereon, forming such casting by injecting casting material into the die cavities, then moving the core to position said insert and resulting casting at a trimming station, trimming the casting, and then stripping the casting from the core member by said dies and relative movement of the core member with respect to the dies. Still more particularly, the invention deals with a method for controlling removal of the inserts one at a time from the discharge end of a hopper and for supporting the insert to be discharged in the operation of attaching the core member thereto.

The novel features of the invention will be best understood from the following descriptions when taken together with the accompanying drawing, in which certain embodiments, by means of which the invention may be practiced, are disclosed, and in which the separate parts are designated by suitable reference characters in each of the views, and in which:

Fig. 1 is a diagrammatic plan view showing the lower chute discharge end of a hopper feed and the insert holding and releasing means therefor.

Fig. 2 is a sectional view through the structure shown in Fig. 1, illustrating the core member in position for insertion into the outermost insert of the hopper chute.

Fig. 3 is a view similar to Fig. 1, showing the hopper chute retracted and indicating one of the inserts arranged upon the core.

Fig. 4 is a diagrammatic side view of the mechanism as seen in Fig. 3, illustrating the impression surface of one part of a die, with the core preparatory for movement of the insert to position between the two parts of the die.

Fig. 5 shows the insert in the casting position with a cast plastic member formed on said insert.

Fig. 6 is a view similar to Fig. 5, showing how the gate is sheared from the casting.

Fig. 7 shows the dies closed around the core and casting at the completion of the trimming operation preparatory to raising the core to strip the casting therefrom; and Fig. 8 shows a perspective view of a casting stripped from the die.

In illustrating one adaptation of my improved method, I have shown the formation of what is known as a cap member 10, note Figs. 5 and 8, for use in conjunction with flashlight and similar batteries. The cap member comprises a disc-shaped body 11 of plastic material having a bore 12, the length of the bore being extended in the plastic body by a raised annular collar 13. Embedded in the cap member 10 is a metallic thimble-shaped or cup-shaped insert 14. The upper open edge of the insert has a laterally extending circumferential flange 15 which forms an anchor portion disposed within and substantially centrally between upper and lower surfaces of the plastic disc 11. It will also appear that the bore or recess 16 of the insert 14, note Fig. 5, is in alinement with the bore 12 of the body 11. In the construction shown, the bottom wall 17 of the insert 14 has a slight downwardly extending bead or projection 18 centrally thereof.

Turning now to Figs. 1 to 4 inclusive, in these figures, I have diagrammatically illustrated at 19, the lower chute or discharge end of any suitable hopper mechanism. This chute includes a channel portion 20 into which the successive inserts are fed, by gravity, to the discharge end 21 of the channel.

Pivotally mounted on the chute 19, as seen at 22—22', are a pair of fingers 23—23'. The fingers have at their free ends, curved jaw portions 24—24' to fit snugly around the cylindrical or cup-shaped body of each insert 14 so as to hold the insert in position, the fingers being tensionally maintained in holding position by springs 25—25'. Stop pins 26—26' are employed to check closing movement of the fingers.

In Fig. 7 of the drawing, I have shown a die comprising a pair of similar relatively movable die parts 27—27'. In Figs. 4, 5 and 6, only one part 27 of the die is illustrated. As both die parts are the same, the brief description of one will apply to both.

Each die part has a cavity 28 for formation of the plastic disc body 10, including a gate portion 29, leading to the cavity 28. Each die part is also recessed, as seen at 29ª, for the reception of a core member 30, as well as the insert 14. In other words, the large diameter shown of the core member is the same, or substantially the same as the outside diameter of the cup-shaped portion of the insert 14. The core member has a reduced collar portion 31 which is adapted to fit snugly or rather frictionally within the bore 16 of the insert so as to support the insert against accidental displacement from the core, as will be apparent from the method later described.

The collar portion 31 terminates in a rounded fillet, as at 32, to form the rounded surface 33 on the casting 10, as seen in Fig. 5 of the drawing. The core member 30 also has a further reduced end 34, which is adapted to engage the bottom 17 of the insert, and thus limit the frictional surface engagement of the collar 31 with the insert, as will clearly appear from a consideration of Fig. 4 of the drawing.

Each die part has on its lower surface and around the bore or recess 29a, an enlarged recess 35, note Figs. 5 and 6, for reception of the collar portion 13 of the casting when moved into the trimming and stripper stations, as illustrated in Figs. 6 and 7 respectively. Each die part 27 is also recessed, as seen at 36, and the lower portion of the recess terminates in a bevelled cutter 37 and these cutters operate to sever and remove the gate portion 38 from the casting, as clearly illustrated in Fig. 6 of the drawing. It will be apparent that the recess 36 provides clearance for the gate portion 38 in the operation of closing the dies and also for discharge of the gate portion when the dies are separated or after the stripping operation.

In Figs. 4, 5 and 6, I have indicated at 39, the discharge nozzle through which heated plastic material is pressure injected into the cavities 28 through the gate 29 in forming successive castings. My improved method will be readily understood from the foregoing description when taken in conjunction with the drawing and the following statement:

It will be understood that the core member 30 is positioned centrally with respect to the abutting surfaces of the dies and is moved vertically with respect to the dies in delivery of inserts to the cavities of the dies and in moving the resulting casting to the trimming and stripper stations. The core member is normally disposed above and in wide spaced relation to the upper surface of the die and in a cycle of operation the chute 19 is positioned beneath the core member so as to dispose the end or outermost insert 14 directly beneath the core member in the manner seen in Fig. 2 of the drawing. The core member is now moved down into the bore 16 of the insert to a position similar to that shown in Fig. 4, where the collar 31 frictionally engages the bore. In this operation, it will be apparent that the flange 15 of the insert has a large surface bearing upon the jaw ends 24—24' of the fingers 23—23'. Upon attaching the outermost insert 14 to the core, the chute end 19 is then retracted to the position shown in Figs. 3 and 4, in which operation, the outermost insert 14 has been sprung out of the jaws 24—24' against the action of the springs 25—25', and immediately upon releasing the insert 14, the fingers 23—23' snap inwardly and engage the next successive insert which has been designated as 14' in Figs. 3 and 4.

The core 30, with the insert 14 thereon is now in position for movement downwardly between adjacent surfaces of the die parts 27—27', which die parts are in open position. The result of this downward feed movement of this core member is shown in Fig. 5. This movement is suitably controlled so as to retain the anchor flanges 15 within the cavities 28 and in spaced relation to the walls thereof, as clearly shown. The dies are then brought into closed position around the core and insert 14 and suitable plastic material is injected, under pressure, through the nozzle 39 into the gate 29 and thus into the cavities 28 to form the plastic body portion of the cap 10. The die parts are then separated and the core member is lowered to the position shown in Fig. 6, in which position the dies are then moved into closed position, as clearly seen in Fig. 7 of the drawing. The casting is trimmed in this operation to remove the gate 38. The final step in the method consists in moving the core 30 upwardly while the dies are in closed position, which will strip the core from the insert and the casting, thus allowing the cast cap to drop into a suitable receptacle, not shown. The dropped or removed casting is indicated in Fig. 8 of the drawing.

In moving upwardly, the core 30 returns to the raised position illustrated in Fig. 2, and the chute 19 is then returned to the position shown in Fig. 2, with the outermost insert positioned beneath the core, whereupon the above cycle of operation is again repeated.

The inserts are delivered to the discharge end of the chute by gravity, from the hopper feed or any suitable means may be provided to maintain the outermost insert of the chute substantially in alinement with the core 30. Positive alinement is not absolutely essential in that the bevelled surface 40 between the collar portion 31 and reduced end 34 will serve to accurately guide the collar portion 31 into the inner diameter or bore 16 of the insert.

With my improved method, it will be apparent that after the insert has been once attached to the core in the manner described, the core then moves the insert to the several positions mentioned, carrying with it, the cast cap, as illustrated in Figs. 5, 6 and 7 of the drawing. It will be apparent that a very simple and practical method is provided for automatically forming, trimming and ejecting plastic members having metallic inserts as part thereof. Further, from a consideration of the drawing, it will be apparent that the collar portion 31, in addition to providing means for coupling the insert therewith also forms a core for formation of the bore 12 of the cap. In the construction shown, this bore is of common diameter to the inside diameter 16 of the insert. The friction fit of the insert on the collar portion 31 additionally serves as a seal to prevent injected plastic material from entering the bore 16 of the insert.

For purposes of description, the chute 19 and its associated parts may be considered an insert delivery mechanism and this mechanism is brought into and out of the path of the insert pick up and feed member, namely the core 30, in movement of said member into different positions relatively to the opening and closing dies or die parts in producing the casting, in trimming the casting and then in finally stripping and ejecting the casting.

Having fully described my invention, what I claim as new and desire to secure by Letters Patent is:

1. The method of feeding recessed bodies to a pair of relatively movable dies having mating cavities and casting a plastic member thereon which comprises feeding successive bodies by gravity to a body pickup station in alinement with a vertically movable core and with said die cavities, yieldably restraining and supporting each body at said pickup station, moving the core downwardly into the recess of a body at the pickup station to frictionally engage and attach the body to the core, then removing the next successive bodies as a group in a direction away from said pickup station to provide a free path for the core and attached body, moving the core and body into the die cavities, closing the dies about the core and body, injecting molten plastic material into the die cavities to form a product comprising said plastic member surrounding the core and surrounding the body, said core preventing molten plastic material from entering the recess of said body, opening the dies, moving the core and the attached body having the plastic member thereon in the same direction as the preceding movements of the core to a trimming station adjacent the die cavities, closing the dies about said core above said body and plastic member and coincidently trimming the plastic member, then, while the dies are still closed, moving the core in a direction opposite to the said preceding movements to strip therefrom the body having the plastic member thereon and to withdraw the core from the die cavities.

2. The method of feeding an apertured insert to a pair of relatively movable dies having mating cavities and casting a plastic member thereon which comprises moving said insert into the path of a core which is movable downwardly toward and upwardly from said die cavities, supporting the insert in said path, moving the core downwardly into the aperture of said insert to frictionally engage the insert so as to mount the latter on the core, moving the core and the insert downwardly into the die cavities, closing the dies about the core and insert, injecting molten plastic material into the die cavities and in contact with the core and insert to form a casting comprising said plastic member surrounding the core and engaging the insert, said core preventing molten plastic material from entering the aperture of said insert, opening the dies, moving the core and insert having the plastic member thereon in the same direction as the preceding movements of the core to a trimming station adjacent the die cavities, closing the dies about said core and coincidentally trimming the plastic member, then, while the dies are still closed, moving the core in a direction opposite to the said preceding movements to strip therefrom the plastic member and the insert and to withdraw the core from the die cavities.

3. The method of feeding a recessed body to a pair of relatively movable dies having mating cavities and casting a plastic member thereon which comprises moving a core downwardly into the recess of the body to frictionally engage and hold the body and to seal off said recess, moving the core and the body supported thereon downwardly into the die cavities, closing the dies and injecting plastic material into the die cavities to form a casting comprising said plastic member surrounding the core and the body, opening the dies, moving the core and casting downwardly to a trimming station spaced from the die cavities, closing the dies to enclose the core in the die cavities but not the casting, trimming the casting, then, while the dies are still closed, moving the core in a direction opposite to the preceding movements of the core to strip therefrom the casting and to withdraw the core from the die cavities.

LOUIS H. MORIN.

REFERENCES CITED

The following references are of record in the file of this patent:

UNITED STATES PATENTS

| Number | Name | Date |
| --- | --- | --- |
| 1,022,043 | Muther | Apr. 2, 1912 |
| 1,099,717 | Neuberth | June 9, 1914 |
| 2,367,235 | Morin | Jan. 16, 1945 |
| 2,380,042 | Hauton | July 10, 1945 |
| 2,438,348 | Morin | Mar. 23, 1948 |